United States Patent [19]

Williams

[11] Patent Number: 4,769,866
[45] Date of Patent: Sep. 13, 1988

[54] MULTI-STATION SYSTEM TO ACT UPON FOOTWEAR UPPER ASSEMBLIES WITH TRANSFER BETWEEN STATIONS THEREOF

[75] Inventor: Gregory A. Williams, Litchfield, N.H.

[73] Assignee: International Shoe Machine Corporation, Nashua, N.H.

[21] Appl. No.: 933,659

[22] Filed: Nov. 21, 1986

[51] Int. Cl.$^4$ ............................................. A43D 11/00
[52] U.S. Cl. .......................................... 12/1 A; 12/1 R
[58] Field of Search ........................ 12/1 A, 1 R, 4.6; 414/732, 744 A, 783; 901/8, 31

[56] References Cited

U.S. PATENT DOCUMENTS

| | | | |
|---|---|---|---|
| 3,682,327 | 8/1972 | Winne | 901/31 |
| 4,042,122 | 8/1977 | Espy et al. | 414/783 |
| 4,062,455 | 12/1977 | Flatau | 414/744 A |
| 4,273,506 | 6/1981 | Thamson et al. | 414/744 A |
| 4,274,802 | 6/1981 | Inaba et al. | 414/783 |
| 4,557,386 | 12/1985 | Buckley et al. | 209/556 |
| 4,599,759 | 7/1986 | Price et al. | 12/1 A |
| 4,606,696 | 8/1986 | Slocum | 414/744 R |
| 4,648,771 | 3/1987 | Yoshioka | 414/744 A |
| 4,652,204 | 3/1987 | Arnett | 414/751 |
| 4,676,002 | 6/1987 | Slocum | 33/1 MP |

FOREIGN PATENT DOCUMENTS

| | | | |
|---|---|---|---|
| 17152 | 8/1968 | Australia | 414/744 A |
| 2566635 | 1/1986 | France | 12/1 A |
| 0837852 | 6/1981 | U.S.S.R. | 414/732 |

Primary Examiner—Steven N. Meyers
Attorney, Agent, or Firm—Robert Shaw

[57] ABSTRACT

For use in a system that includes first and second machines to perform operations on a footwear upper assembly, a transfer machine that includes an activator arm assembly, and a gripper assembly rotatably and pivotally connected to one end of the activator arm assembly. The gripper assembly includes a pair of fingers with a gripper jaw pivotally secured to each of the fingers. The pair of fingers are movable toward and away from each other respectively to grasp and release the footwear upper assembly. The pivotal attachment of the jaws permits the jaws to adjust to the irregular profile of the footwear upper assembly, a situation which is enhanced by the geometry of the gripper jaws which permits contact between the jaws at regions spaced longitudinally along the footwear upper assembly and by choosing a jaw material that is soft enough to deform, and hence provide larger contact area between the upper assembly and the jaws.

21 Claims, 6 Drawing Sheets

MULTI-STATION SYSTEM TO ACT UPON FOOTWEAR UPPER ASSEMBLIES WITH TRANSFER BETWEEN STATIONS THEREOF

The present invention relates to systems to perform operations on footwear upper assemblies, which systems employ transfer mechanisms to move a footwear upper assembly automatically from station-to-station and to re-orient the footwear upper assembly, and to transfer mechanisms per se.

In the explanation that follows emphasis is placed on operations performed on shoe upper assemblies that include a last, an insole disposed on the last bottom and a shoe upper draped about the last—but the invention includes systems used to operate upon boots and other footwear upper assemblies. Indeed, one non-trivial consideration in most shoe machines is the need to provide machinery that can accommodate boots with their tube-like extensions. In the explanation the system disclosed is one that includes a side and heel laster, which performs an early operation on a shoe assembly, and a multi-lane heat setter that performs another shoe operation. Both machines are in use in the shoe industry. A transfer mechanism, as later discussed, is used to move the shoe assembly from the side and heel laster to the correct lane of the heat setter and with proper orientation.

Shoe machines in some respects, resemble machine tools in their functions but are also quite different from machine tools. In particular a shoe upper assembly requires many intricate operations which must be accomplished with precision and which require fairly high forces of various nature; but, unlike a metal piece that is being machined, a shoe upper is delicate and can easily be scuffed, wrinkled or otherwise deformed. Such shoe uppers are made of leathers or man-made materials and can take a set; furthermore, the color applied is usually a surface film that is receptive to scratching. A shoe machine must, therefore, touch, grasp or otherwise address a shoe upper assembly in a way that the assembly is not marred.

Furthermore, in shoe making many shoe sizes, shapes, styles and the like must be formed on the same machine group. Hence any transfer mechanism must accommodate shoe upper assemblies in many forms, including boots, as above noted, and yet perform with required precision.

Until relatively recently the shoe industry has almost exclusively employed air pressure as the motivating mechanism in its machines, the drivers being air cylinders. Air cylinders in most general use are binary in operation in that they are on-off and two-position. Machines employing air pressure, then, must be designed to provide ways to make a movable machine element stop, for example, at a particular place. While electric drives using servomotors and the like have been developed, yet the industry continues to use air power whenever it can be successfully employed.

In any multi-machine system in the shoe industry, employing a transfer mechanism, it is unlikely that positioning of machines will be achieved with accuracies in the mil range. Hence transfer mechanisms for use in such system must be able to accommodate some misalignment and/or mis-positioning.

Accordingly, it is an object of the present invention to provide a system that includes a transfer mechanism to acquire a shoe upper assembly from a first shoe machine and to transfer the upper assembly to a second shoe machine in a sequential operation, the upper assembly being reoriented and indexed automatically for operation thereon by the second machine.

Another object is to provide a transfer mechanism using mostly air-operated devices that can be adjusted to correct for some misplacement of machines in the system.

Still another object is to provide a transfer mechanism that is able to locate and remove a shoe upper assembly from an automatic side and heel laster and to deliver the upper assembly to a predetermined lane of a multi-lane heat setter.

A further object is to provide a free-standing transfer mechanism.

A still further object is to provide a mechanism that has three-dimensional adjustment and rotational adjustment to accommodate different widths, lengths and shapes of shoes in the vertical and horizontal planes.

These and still further objects are addressed hereinafter.

The foregoing objects are attained, generally, in a system that includes a first machine to receive a footwear upper assembly, the footwear assembly including a last, an insole disposed on the last bottom and a footwear upper draped about the last. The system includes a transfer machine having an activator arm assembly and a rotatable gripper assembly that is operable to grasp the footwear upper assembly, when the upper assembly has been operated upon, and to remove the upper assembly from the first machine, the transfer machine being normally inoperative, but including a control mechanism adapted to render it operative; and a signaling device connected to receive a signal from the first machine indicating that the upper assembly has been operated upon, the signaling device being connected to introduce a control input to the control mechanism to render the transfer machine operative to remove the upper assembly from the first machine and deliver it automatically to a second machine properly oriented for operation thereupon by the second machine. The transfer machine must include apparatus to permit positioning of the gripper to accommodate positioning errors because of differing styles and sizes of footwear as well as variations in last sizes. The invention resides in a novel transfer mechanism, as well.

The invention is herinafter described with reference to the accompanying drawing in which.

Figure 6:
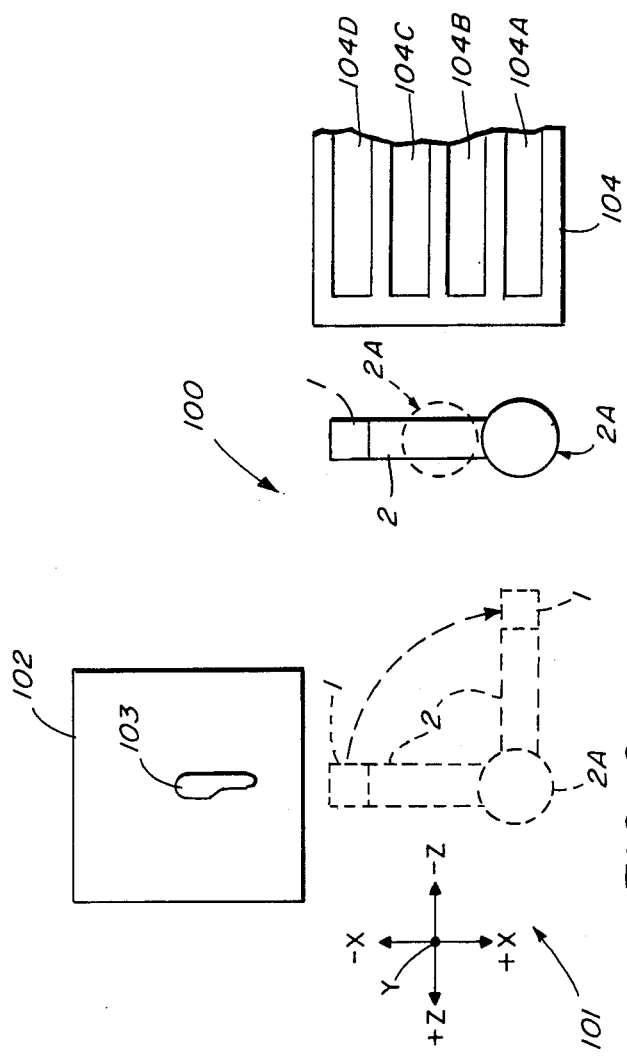
FIG. 6 is a plan view, diagrammatic in form, of the system in the earlier figures.
Figure 7:
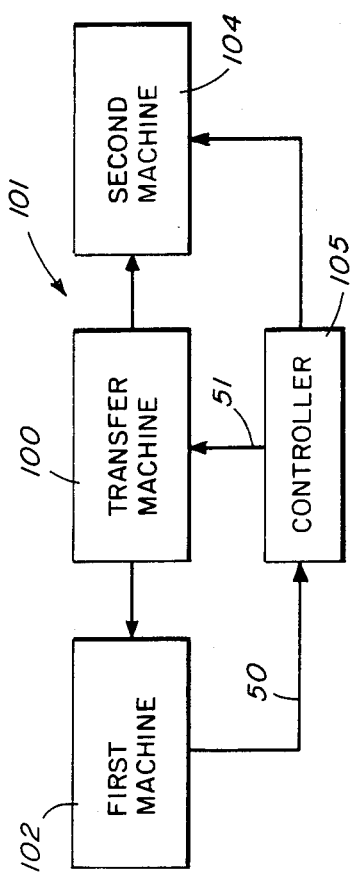
FIG. 7 is a block diagram representation of the system in the earlier figures.

Turning first to FIG. 7, there is shown at 101 a system that includes a first machine 102 to receive a shoe (or other footwear) upper assembly 103 in FIG. 6 and adapted to perform an operation on the shoe upper assembly 103. The shoe upper assembly 103 includes a last, an insole disposed on the last bottom and a shoe upper draped upon the last, as is shown, for example, in U.S. Pat. No. 4,553,281 (Vornberger). The first machine may be a side and heel laster as shown in the Vornberger patent. The assembly 103 is removed by a transfer machine 100 from the first machine 102, after it has been operated upon, and is delivered automatically to a second machine 104 which, in this illustrative showing, is a heat setter which is known in this art. The transfer machine 100 must be able to adjust for height differences between the machines 102 and 104, inexact positioning therebetween, position errors due to differing styles and sizes of shoes, variations in last sizes, and like discrepancies from shoe upper assembly 103 to shoe upper assembly. Furthermore, as is shown below, typically, the upper assembly 103 will have one spatial orientation in the machine 102 and another in the machine 104; and the height of the workplace may, and usually does, differ from machine to machine. In addition to the foregoing, the upper being acted upon and transferred from machine-to-machine is delicate and easily married; marring is a condition that cannot be accepted in the shoe industry. Among other things, the transfer mechanism 100 is adapted to accommodate to these other and further peculiarities of the shoe machine industry; it is, for example, able to apply three-dimensional adjustments to permit registration, automatically, of the various interacting units in the system 101. Before describing details of the system 101, one further aspect is addressed.

The transfer machine 100 in the figures is shown in a number of orientations which are established by the controller labeled 105 in FIG. 7. When the shoe upper assembly 103 is placed in the laster 102, the controller 105 directs the transfer machine 100 to a position relative to the machine 100. At that time the transfer machine 100 is inoperative, but the controller 105 includes devices to render it operative. The first machine 102 (i.e., the block 102 in FIG. 7) includes a signaling device (e.g., a position or proximity sensor) to generate a signal from the first machine 102 indicating the upper assembly 103 has been operated upon, the signaling device being connected to introduce a control input to the controller (or control mechanism) 105 to render the transfer machine 100 operative to remove the shoe upper assembly 103 from the first machine 102 and deliver it automatically and with proper orientation and position—to the second machine 104 for operation thereupon by the second machine. Detailed structural aspects of the system 101 now follow.

The transfer machine 100, as noted in FIGS. 1-5 and 8, includes a gripper assembly 1, an activator arm assembly 2, and a slide assembly 3. The combination of elements 1, 2 and 3 serve as a pick and place arm assembly 2A that is operable to grasp the upper assembly 103 in FIG. 2, when the upper assembly 103 has been operated upon, and to deliver the upper assembly automatically to the second machine 104 properly oriented for operation thereupon. In this explanation, as noted, the first machine 102 is an automatic side and heel laster and the second machine is a multi-lane heat setter. A signaling device in the first machine 102 sends an electrical signal at 50 in FIG. 7 to the controller 105 indicating that the upper assembly has been operated upon. The controller 105 introduces a control input 51 to the transfer machine 100 to render the normally inoperative transfer machine 100 operative to remove the upper assembly 103 from the first machine 102 and deliver it automatically to the second machine 104 properly oriented and positioned thereupon by the second machine 104. A detailed explanation of the transfer machine 100, now follows.

Figure 8:
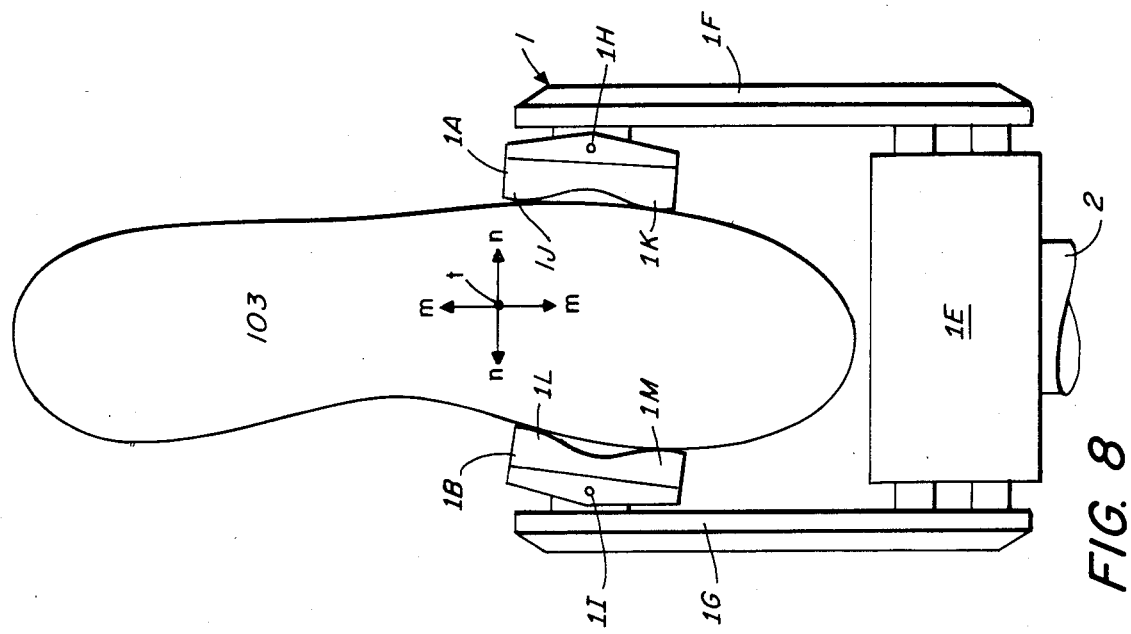
FIG. 8 is a plan view of a shoe upper assembly, firmly held by a gripper in the transfer machine shown in the earlier figures.

The gripper assembly 1 includes a pair of gripper fingers 1F and 1G in FIG. 8, as later discussed, and a rotary actuator 1N in FIG. 1 that rotates the gripper fingers 180 mechanical degrees about the longitudinal axis of the upper assembly 103 in FIG. 8; that axis is the m-m axis of the gripper assembly 1 in FIG. 8. The gripper assembly 1 is pivotally attached to the activator arm assembly 2 by a transverse axis or pivot 1D in FIG. 1 to permit tilting of the gripper assembly through an arc a of about fifteen mechanical degrees. The pivoting is achieved by an air cylinder 1C in FIG. 1. In FIG. 8, the axes labeled m-m, n-n and t are respectively the longitudinal axis, the transverse axis and the thickness axis of the upper assembly 103.

Figure 1:
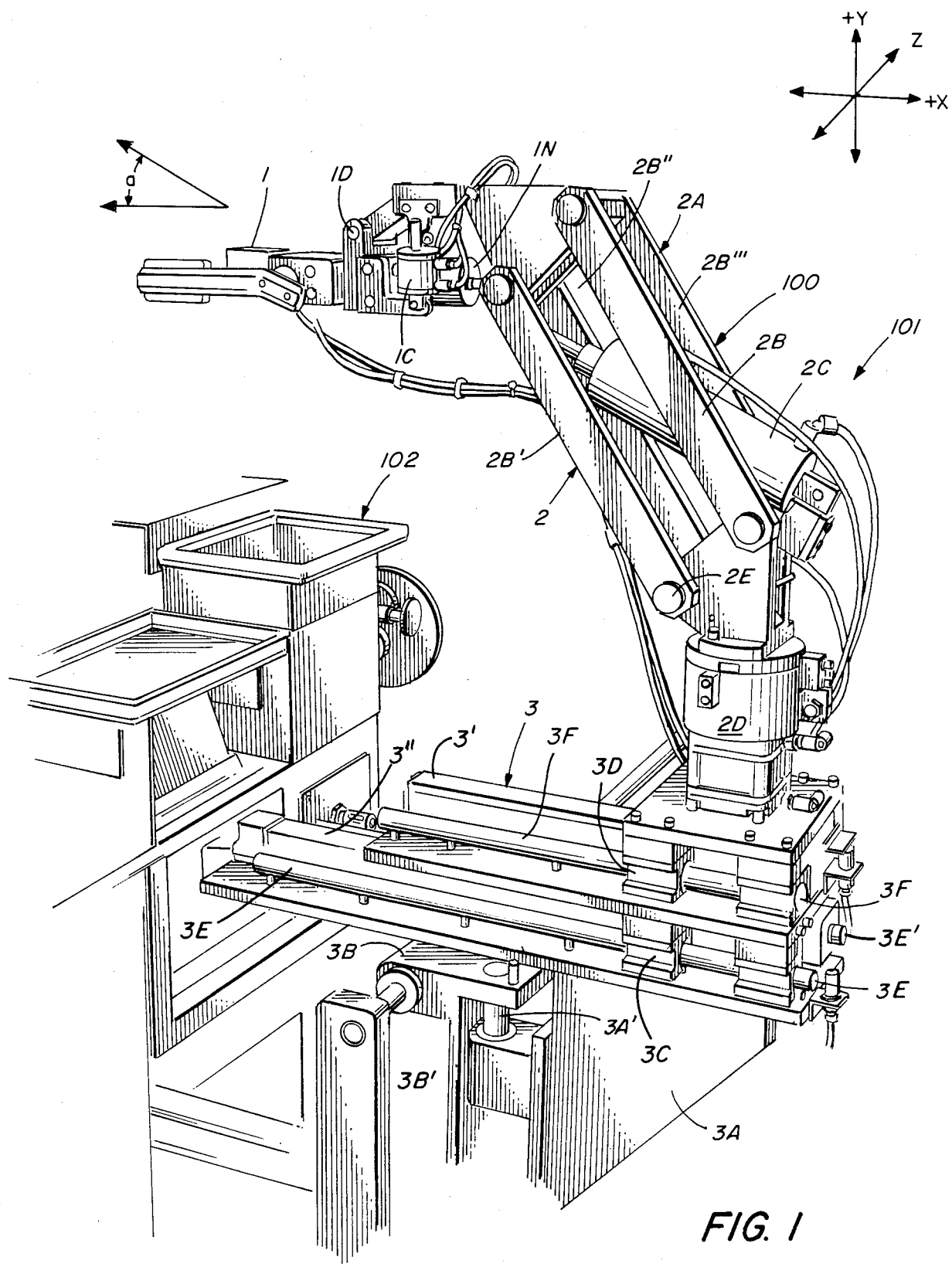
FIG. 1 is an isometric view showing portions of a system that includes a first machine (e.g., a side and heel laster) to last a shoe upper assembly and a transfer machine (or mechanism) to remove the shoe upper assembly, once lasted, from the first machine.
Figure 2:
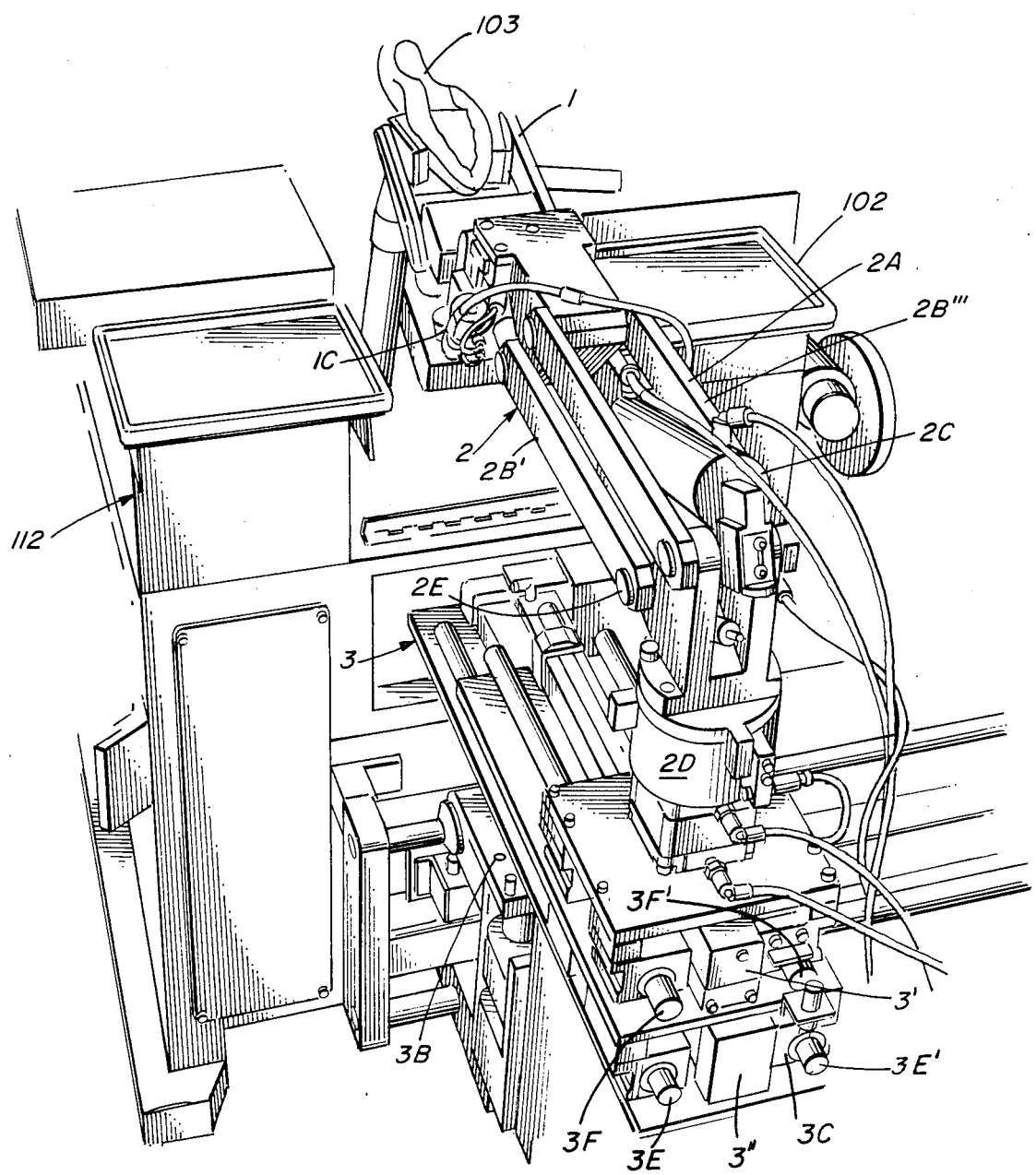
FIG. 2 is an isometric view of many of the system parts shown in FIG. 1 but taken to the right of the view in FIG. 1 and showing a footwear upper assembly.
Figure 3:
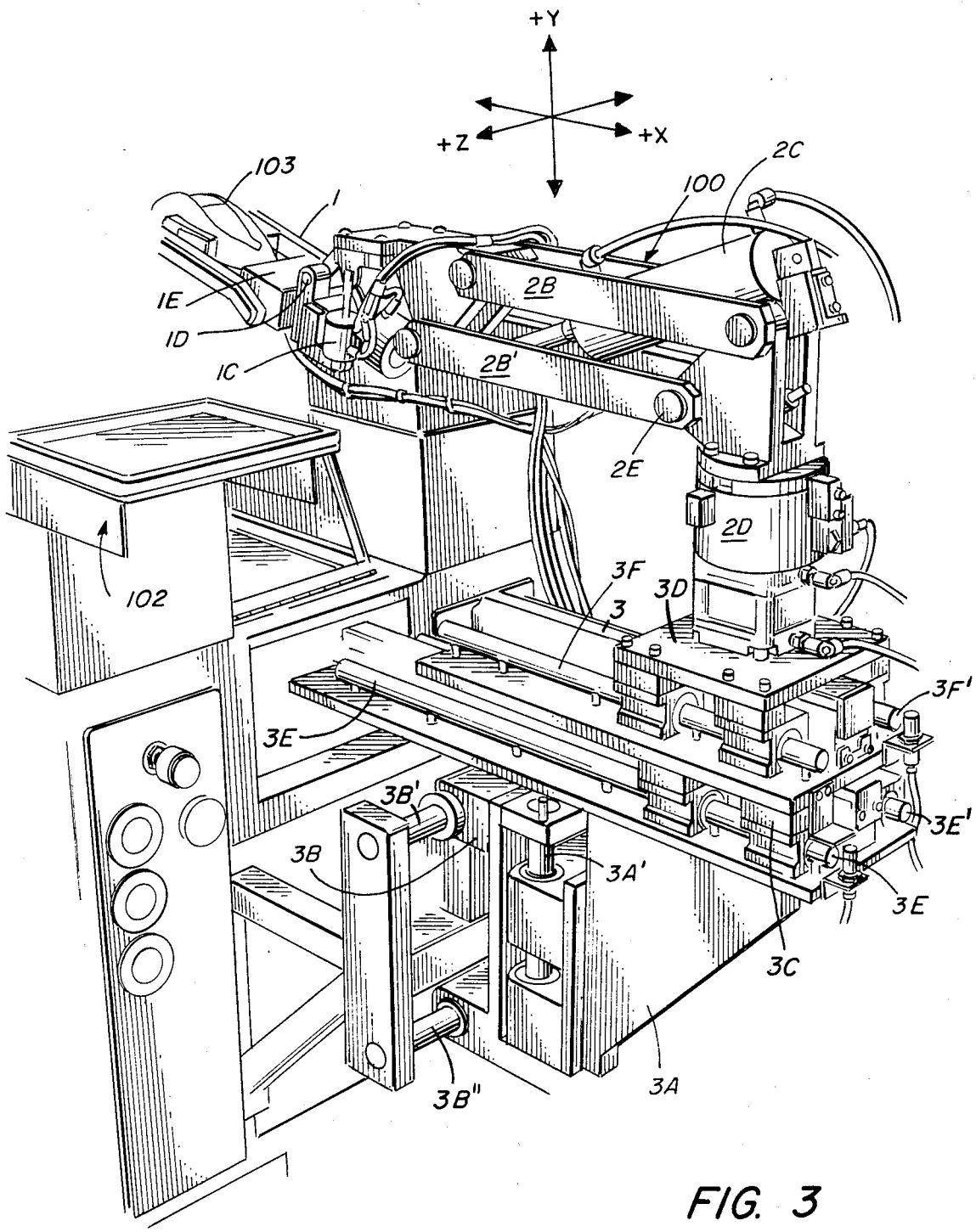
FIG. 3 is an isometric view similar to the view in FIG. 1 but taken to the left of the latter.
Figure 4:
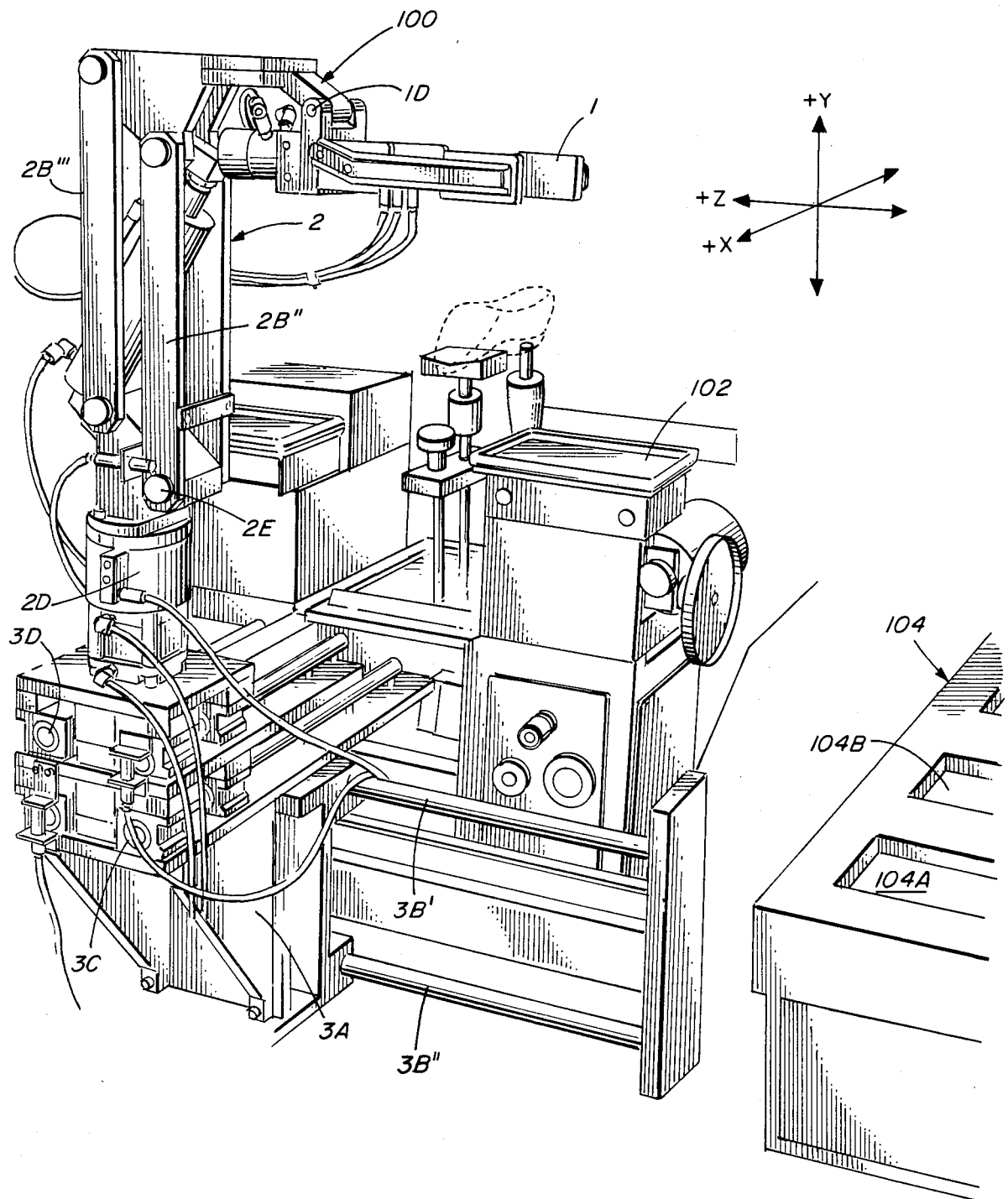
FIG. 4 is an isometric view from the opposite side of the system from that shown in FIG. 1 and showing the first machine, the transfer machine and a second machine to which the lasted upper assembly is delivered.

The activator arm assembly 2, as shown in FIG. 1, can move ninety or more mechanical degrees about a transverse major axis 2E. The activator arm 2 includes a four-bar linkage consisting of mechanical linkages 2B, 2B', 2B", and 2B'" whose purpose it is to hold the gripper assembly at a predetermined and non-varying orientation, e.g., with its longitudinal axis parallel to the machine base (typically this is parallel to the floor) during arm extension and retraction, that is, extending to grasp the upper assembly 103 and moving it to the second machine 104. The fifteen degree tilting action noted above is necessary because the side laster supports the upper assembly 103 at a fifteen degree angle during side lasting, as is common in this industry. An air cylinder 2C serves to extend and retract the activator assembly arm 2 by pivoting about the transverse axis 2E. A rotary actuator 2D moves the activator assembly arm 2 about the Y-axis in the figures through ninety mechanical degrees (or more if needed) to achieve alignment with the heat setter 104.

The slide assembly 3 has a carriage 3A that slidably moves along two shafts 3A' (only one of the shafts is shown), to adjust for height differentials between the first machine 102 and the second machine 104. Thus, the gripper assembly 1, the activator arm assembly 2 and the slide assembly 3 can be moved up and down. A carriage 3B moves or ways 3B' and 3B" along the Z-axis to position the gripper assembly 1 and the activator arm assembly 2 adjacent either the machine 102 or the machine 104, as the case may be. The carriages 3B and 3A, then, position the gripper assembly 1 respectively parallel to the base of the machine 102 ($\pm$x direction) and vertically ($\pm$y direction) to position the gripper assembly 1 relative to the particular machine.

Two separate carriages 3C (the lower carriage in FIG. 1) and 3D (the upper carriage in FIG. 1) serve to move the active parts of the pick and place arm assembly 2A along the X-axis in FIG. 1, as now explained. The complete carriage assembly 3D rides piggy-back (i.e., telescopic) on the carriage 3C. The total function of the carriages 3C and 3D is to position the gripper 1 at one or the other of four lanes in the heat setter 104. The carriages 3C and 3D have linear motion along the X-axis along ways 3E-3E' and 3F-3F', respectively, driven by air cylinders 3' and 3", respectively, in FIG. 1. They are arranged to permit fairly accurate indexing of the gripper assembly 1 along that x-axis to four spaced stations which are the lanes labeled 104A-104D in FIGS. 5 and 6, despite the fact that the carriages are air-activated and, hence, not accurately positionable between end stops of a cylinder stroke.

Initially the gripper assembly 1 and assembly 2 are in the solid position in FIG. 6. They are moved to the left to the broken-lines vertical position to grasp the shoe upper assembly 103. The activator arm assembly 2 (with the gripper 1 at its free end) is rotated about the y-axis to the left-most broken line horizontal position. It is then moved to the right to the right-most horizontal position where it is disposed over the lane 104A onto which it deposits the upper assembly 103. The gripper then picks up the second upper assembly 103 in the same way; afterward the carriage 3D moves its full stroke in the −x direction to deposit the upper assembly onto the lane 104B. After the third upper assembly has been picked up the carriage 3C moves its full stroke (the carriage 3D is retracted to its initial position) to register with the lane 104C. The last or fourth upper assembly is deposited onto the lane 104D by both the carriages 3C and 3D extending to their full stroke. Then the sequence is repeated. It is necessary to have four lanes because the belt speed of the heat setter 104 is so slow that upper assemblies would otherwise be deposited onto one another, although recent developments indicate that fewer than four lanes may be used.

Figure 5:
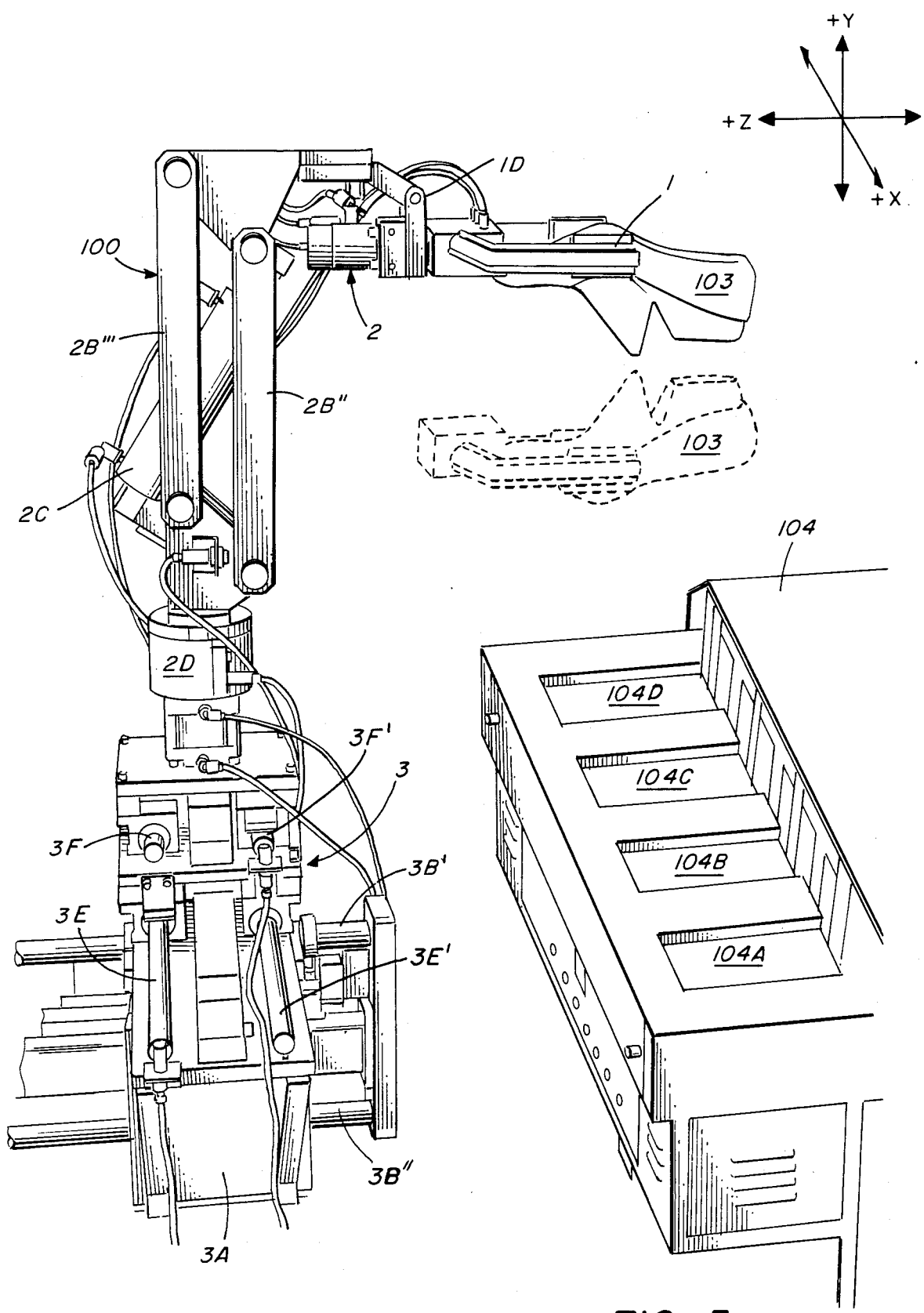
FIG. 5 is an isometric view taken to the left of the view in FIG. 4, the first machine being omitted.

Mention is made earlier to the three axes in FIG. 8 with respect to the upper assembly 103. It is essential for present purposes that each assembly 103 be grasped in a secure manner with an orientation in all planes that is the same from assembly 103 to assembly 103. Toward this end the pair of fingers 1F and 1G have jaws 1A and 1B, respectively, secured to the inside of the associated fingers and positioned to contact the footwear upper assembly 103 at the ball region thereof; the gripper jaws 1A and 1B are moved toward and away from each other by an air cylinder 1E respectively to grasp and release the upper assembly 103. The gripper jaws 1A and 1B pivot at 1H and 1I, respectively, so that longitudinally spaced projections 1J-1K and 1L-1M of the jaws (or pads) 1A and 1B, respectively, can grasp the upper firmly at two longitudinally spaced points of contact; that is, spaced in the longitudinal direction along the m-m axis of the upper assembly 103. Pivoting of the jaws about the 1H and 1I axes is about the thickness axis t. The important issue here is that the position of the upper assembly 103, when grasped, relative to the gripper 1 be known with acceptable accuracy and that the upper assembly be grasped securely, yet without marring the outer upper surface. The jaws 1A and 1B are made of a plastic (urethane) material whose durometer is low enough to prevent marring of the upper yet high enough to securely grasp the upper assembly. The low durometer also permits deformation of the pad thereby to conform to the irregular shape profile of the upper assembly, at and near the four contact points or projections 1J . . . 1M. In this way a larger surface area of contact between the projections 1J . . . and the ball region of the upper assembly 103 can be achieved. The projections 1J . . . must be separated longitudinally from one another a sufficient distance that the footwear upper assembly does not pivot with respect to the jaws, that is, about the n—n axis in FIG. 8. The upper assembly 103, as shown in FIG. 5, is rotatable through 180 degrees about its longitudinal axis (shown dotted) prior to presentation to the second machine 104.

Thus the transfer machine 100 functions to grasp the upper assembly 103 after it has been operated upon by the first machine 102 and deliver it automatically to the second machine 104 for further operations thereon. The machine 100 is adjustable to interface with the first machine 102 as well as the second machine 104. It grasps the upper assembly 103 gently, yet firmly, and it accommodates both shoes and boots with their tube-like extensions. Further it is adjustable and adapted to take into consideration varying levels of work stations between the first machine 102 and the second machine 104, orientations of the work stations between the first machine 102 and the second machine 104 and the fragile nature of the upper assembly 103.

Modifications of the invention herein disclosed will occur to persons skilled in the art and all such modifications are deemed to be within the scope of the invention as defined by the appended claims.

What is claimed is:

1. In a system that includes a first machine to receive a footwear upper assembly and adapted to perform an operation on the footwear upper assembly, said footwear upper assembly including a last, an insole disposed on the last bottom and a footwear upper draped about the last:

a transfer machine that includes an activator arm assembly and a rotatable gripper assembly that is operable to grasp the upper assembly, after the upper assembly has been operated upon, and to remove the upper assembly from the first machine, said transfer machine being normally inoperative, but including a control mechanism adapted to render it operative, the rotatable gripper assembly being disposed at one end, the free end, of the activator arm assembly and being adapted to rotate about the longitudinal axis of the footwear upper assembly, the other end of the activator arm assembly being pivotal about a transverse axis; and a signaling device connected to receive a signal from the first machine indicating that the upper assembly has been operated upon, said signaling device being connected to introduce a control input to the control mechanism to render the transfer machine operative to remove the upper assembly from the first machine and deliver it automatically to a second machine properly oriented for operation thereupon by the second machine, the second machine being a multi-lane heat setter and in which the said other end of the arm is mounted on carriages that serve to index the gripper assembly between the multiple lanes of the multi-lane heat setter, said arm being operable to invert the footwear upper assembly and place the footwear upper assembly onto one or the other of the multiple lanes.

2. A transfer machine according to claim 1 in which the activator arm assembly comprises a four-bar linkage capable of moving the rotatable gripper assembly in a predetermined and non-varying orientation.

3. A transfer machine according to claim 1 in which the said other end of the arm is slidably attached to a vertically oriented shaft, said arm assembly being adapted to slide up and down on the shaft to adjust for height differentials between the first machine and the second machine.

4. A transfer machine according to claim 1 in which the activator arm assembly is an articulated arm assembly that includes a parallel linkage to maintain orientation of the gripper assembly parallel to a predetermined plane while the arm assembly is moved along an arcuate path.

5. A transfer machine according to claim 4 in which the rotatable gripper assembly includes a pair of fingers that are movable toward and away from one another respectively to grasp and release the footwear assembly.

6. A transfer machine according to claim 5 in which each finger of the pair of fingers includes a jaw positioned to contact the footwear upper assembly at the ball region thereof.

7. A transfer machine according to claim 5 which includes a pair of gripper jaws positioned to contact the footwear upper assembly at the ball region thereof, one gripper jaw being attached to the inside of each finger of the pair of fingers to move toward and away from one another as the fingers move respectively to grasp and release the upper assembly.

8. A transfer machine according to claim 7 which includes means to move the fingers toward and away from each other.

9. A transfer machine according to claim 8 in which each gripper jaw is formed of a material that is sufficiently soft that the gripper will deform to conform to the irregular profile of the upper assembly at the region of contact therebetween.

10. A transfer machine according to claim 9 in which each jaw is formed of urethane material.

11. A transfer machine according to claim 5 in which the gripper assembly is pivotally attached to the activator arm assembly at a transverse axis to permit tilting the gripper assembly relative to the activator arm assembly.

12. A transfer machine according to claim 11 in which said tilting is through an arc of about fifteen mechanical degrees.

13. A transfer machine for use in a system that includes a first machine to receive a footwear upper assembly and adapted to perform an operation on the footwear upper assembly, said footwear upper assembly including a last, an insole disposed on the last bottom and a footwear upper draped about the last, said transfer machine comprising:
an activator arm assembly; and
a gripper assembly rotatably and pivotally connected to one end of the activator arm assembly, said gripper assembly including a pair of fingers with a pair of gripper jaws, one jaw of the pair being secured to each finger of the pair of fingers, and means to move the gripper jaws toward and away from each other respectively to grasp and release the footwear upper assembly at the ball region thereof, said jaws being pivotally secured to the respective finger, each jaw including longitudinally spaced projections that grasp the upper firmly at longitudinally spaced contact points separated from one another a sufficient distance that the footwear upper assembly does not pivot with respect to the jaws.

14. A transfer machine according to claim 13 which is rendered operative by a signal from the first machine, when the footwear upper assembly has been operated upon, and which then automatically transfers the footwear upper assembly to a second machine with correct orientation for operation thereupon by the second machine.

15. A transfer machine according to claim 14 in which gripper jaws are formed of a plastic material that is stiff enough to grasp the footwear upper assembly securely, but is soft enough to deform to the profile of the footwear upper assembly at the region of contact between the individual gripper jaw and the footwear upper assembly to enlarge the area of grasp therebetween.

16. A transfer machine according to claim 14 that further includes slide assembly means which is rotatably connected at the other end from said one end of the activator arm assembly, said slide assembly means being operable to effect linear or translational motion of said other end of the activator arm assembly and hence of the gripper assembly to provide linear positioning movements of the gripper assembly relative to the first machine and the second machine.

17. A transfer machine according to claim 16 in which the slide assembly means comprises two carriages, one of which rides piggy-back on the other, to provide multiple positioning of the gripper assembly along one axis of the transfer machine.

18. A transfer machine according to claim 13 in which the gripper jaws are made of a urethane material whose durometer is low enough to prevent marring of the footwear upper and yet high enough to grasp the upper assembly, the gripper being rotatable 180 mechanical degrees about the longitudinal axis of the upper assembly, said jaws being pivotally attached to the fingers to adjust to the irregular profile of the footwear upper assembly.

19. A transfer machine according to claim 13 in which the longitudinally spaced contact points are projections (1J, 1K, 1L and 1M) that are separated longitudinally of the footwear upper assembly a sufficient distance that the footwear upper assembly does not pivot with respect to the jaws, that is, about its transverse axis, the n-n axis thereof, said jaws being made of a material whose durometer is low enough to prevent marring of the surface of the footwear upper assembly whose surface is fragile in nature.

20. A transfer machine that comprises:
a gripper assembly;
an activator arm mechanism connected at one end thereof to the gripper assembly and operable to move the gripper assembly; and
a slide assembly which is rotatably connected to the other end of the activator arm assembly and is operable to effect linear motion of said other end and hence of the gripper assembly to achieve positioning of the gripper assembly at spaced locations along a linear axis of the transfer machine, the slide assembly comprising two carriage assemblies, one of which rides piggy-back on the other, to provide multiple positioning of the gripper assembly, said two carriages being air-activated by air cyinders but being accurately positionable between end stops of a cylinder stroke to achieve indexing of the gripper assembly.

21. A transfer machine according to claim 20 wherein the two carriages are telescopically interconnected and which includes a rotary activator between the activator arm and the slide assembly to effect angular disposition of the gripper assembly about an axis orthogonal to the axis of said linear motion.

* * * * *